Figure 1:
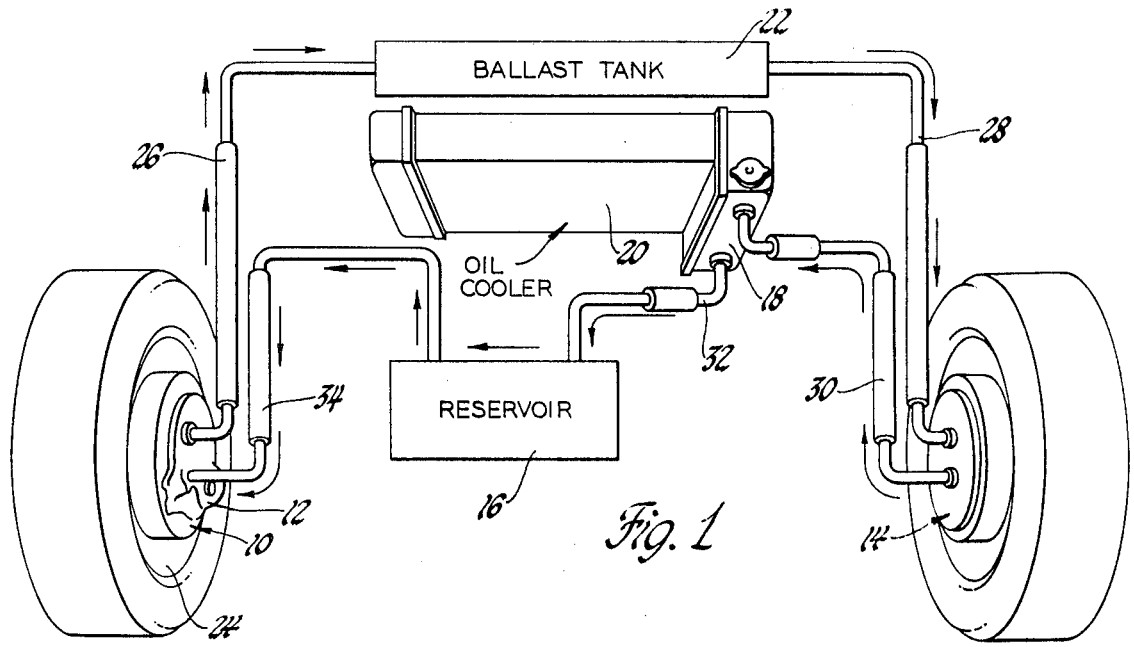

United States Patent

[11] 3,590,960

| [72] | Inventor | Donald W. Reynolds |
| | | Detroit, Mich. |
| [21] | Appl. No. | 829,572 |
| [22] | Filed | June 2, 1969 |
| [45] | Patented | July 6, 1971 |
| [73] | Assignee | General Motors Corporation |
| | | Detroit, Mich. |

[54] BRAKE FLUID COOLING ARRANGEMENT
12 Claims, 2 Drawing Figs.

[52] U.S. Cl.................................................... 188/71.6, 188/264 P, 192/113 B
[51] Int. Cl...................................................... F16d 65/84
[50] Field of Search........................................ 188/264.2, 264.22, 264.25, 264 P, 71.6; 192/113.2

[56] References Cited
FOREIGN PATENTS
624,382 6/1965 Canada .......................... 188/264 P Primary Examiner—George E. A. Halvosa
Attorneys—W. E. Finken and D. D. McGraw ABSTRACT: Fluid cooled brake cooling systems in each of which a plurality of vehicle wheel brakes are connected in series in a cooling circuit. In each system disclosed the circuit includes a pump driven by one of the wheels. In one embodiment the pump moves cooling fluid through a ballast tank, another wheel brake, a heat exchanger, and a cooling fluid reservoir. The fluid from the reservoir is returned to the wheel brake having the pump as a part of the brake assembly. In another embodiment, the pump driven by one of the wheels having a first brake to be cooled moves heated fluid from the first brake through a heat exchanger which cools the fluid, to a second wheel brake to be cooled where the fluid receives heat, then through the heat exchanger to again cool the fluid, after which this cooled fluid is returned to the brake with the pump. A cooling fluid reservoir is connected with the line connecting the pump output and the heat exchanger so that the reservoir can receive fluid from this point and a vent is provided. The reservoir outlet is connected at two points in the circulation system, these two points being between the two outlet points of the heat exchanger and the brake to which fluid flows from each outlet point. The wheel driven pump provides for circulation of cooling fluid through the entire system.

PATENTED JUL 6 1971

3,590,960

INVENTOR.
Donald W. Reynolds
BY
D. D. McGraw
ATTORNEY

BRAKE FLUID COOLING ARRANGEMENT

The invention relates to a fluid cooled brake system, and more particularly to one in which a series arrangement of the various portions of the system is utilized. This arrangement permits the use of a pump in only one wheel, provides for expansion of the fluid as it is heated and contraction of the fluid as it is cooled while maintaining a recirculating system, and requires no cooling control valves. The pump is preferably mounted on the left wheel brake in vehicles which are normally driven on the right side of the road, or in a right wheel brake installed in vehicles which are normally driven on the left side of the road. This is preferable since the wheel located nearer the center of the road is less likely to slide during braking, and usually slides for shorter periods of time when it does slide, thereby having the pump driven by a wheel which is the usually last to cease rotating and the first to resume rotating during a wheel slide condition of operation.

By positioning the components in series, a reduction of required pump capacity of approximately 50 per cent is attained, thus substantially lowering the power requirements for driving a pump. The oil flow arrangement is such that hot cooling fluid from one brake is not directly fed to the other brake unit. The system lends itself to an open control arrangement so that no cooling control valves of any type are required. The elimination of such valves decreases the likelihood of premature brake cooling failure through pump cavitation and slow response. It is desirable to use as the cooling fluid a low viscosity oil with suitable friction additives and a very low viscous shear characteristic. This will maintain the spin loss at the braking plates, and the pumping loss of the cooling system, to a minimum. Such an oil will also produce a relatively low static coefficient of friction and a dynamic characteristic that is independent of speed or pressure in the range of use. It is preferred that the heat exchanger be an oil-to-water cooler in the cold tank of the vehicle radiator. While radiator coolants other than water, or water with glycol preparations, are commonly used, this is referred to as a water coolant for simplicity of explanation.

It is another advantage of this system that the vehicle brakes actually add to the cooling effect of the vehicle engine cooling system. Tests in hot weather and at sustained high speeds have indicated that as much as 10 per cent higher air-to-boil temperature was obtained due to the cooling effect of the brakes. The engine radiator water cooled installation also maintains the brake cooling system at a somewhat higher running temperature in cold weather than does an air cooler, decreasing the brake spin losses. The entire system is so arranged that when the brakes heat up the brake cooling system, the vehicle radiator coolant will overheat or even boil before the brakes are damaged by heat and before the brake cooling fluid is broken down by heat. Thus, the vehicle radiator overheat indicator becomes an indicator of the inability of the brake cooling system to cool the brakes when for any reason the brake cooling system is incapable of removing sufficient heat within the required time period. For example, should some of the brake cooling fluid be lost, or if brake overheating due to extreme braking should occur, it would be indicated by an overheating of the vehicle radiator coolant. The vehicle operator would be readily warned of this condition by his temperature indicating lamp, well before any damage to the engine or brake system would occur.

Figure 2:
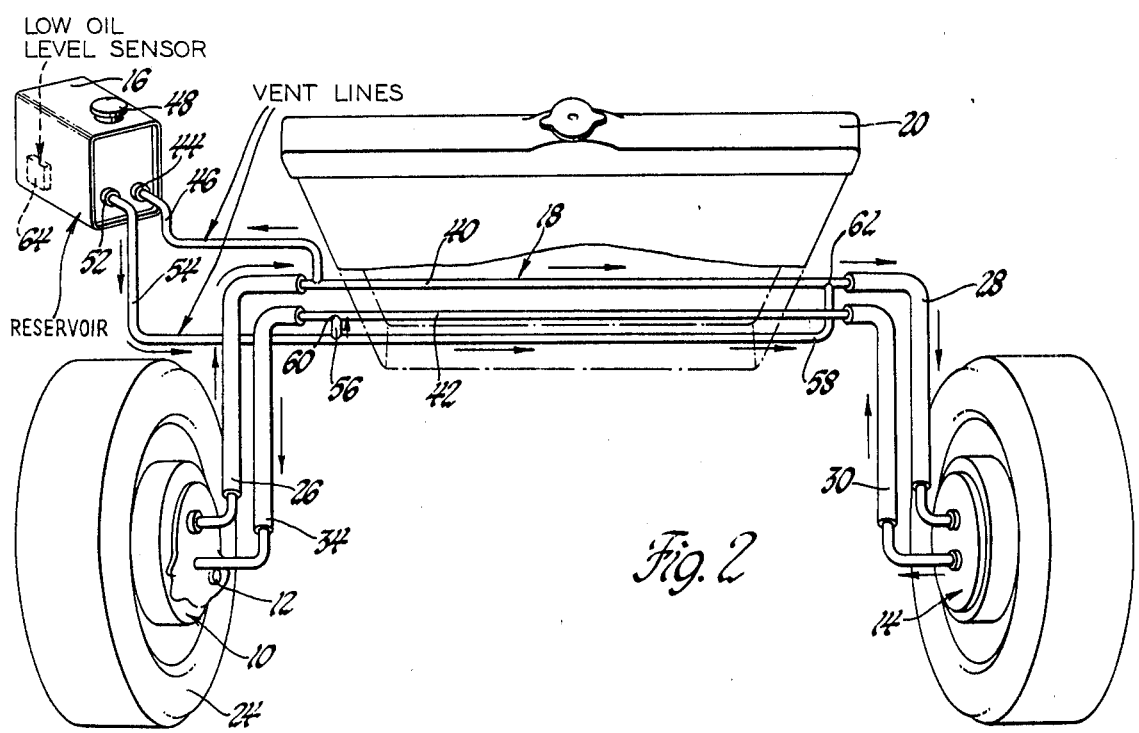

In the Drawings:

FIG. 1 is a schematic representation of a brake cooling system embodying the invention; and FIG. 2 is a schematic representation of a modified brake cooling system embodying the invention.

The system illustrated in FIG. 1 may be utilized with brake assemblies of the type described and claimed in U.S. Pat. application Ser. No. 829,349 filed on even date herewith in the name of Burnette Heck, and assigned to the common assignee.

The vehicle in which the system is illustrated as being installed is a typical vehicle such as that manufactured and used in countries using left-hand drive vehicles. Therefore, the vehicle wheel brake 10 is on the left side of the vehicle, and may be the left front wheel brake. This is the wheel brake which has a wheel driven pump 12. In countries using right-hand drive vehicles, the wheel brake with the pump is preferably located on a right wheel of the vehicle. This arrangement is preferable since the front vehicle wheel normally positioned near the center of the road instead of on the outer side of the road is the wheel which is least likely to slide under hard braking conditions. This is true since under such conditions a vehicle may be operated with the outer side on a berm adjacent the main road surface, and it is not unusual for the berm to be constructed of materials such as loose slag, dirt, or gravel. This material may also be lose on the edge of the main road surface, or the vehicle may be required to move onto the shoulder while braking. The other wheel brake 14 is, therefore, illustrated as being mounted with the front right wheel of the vehicle.

The cooling system includes a cooling fluid reservoir 16; a cooling fluid heat exchanger 18, which is preferably an oil-to-water arrangement utilizing the cold tank of the vehicle radiator assembly 20; a ballast tank 22; and suitable conduits connecting these units and the brakes. The wheel driven pump 12 is geared to be driven at a higher speed of rotation than the speed of rotation of the wheel 24. The pump causes the cooling fluid to flow through the brake 10 and out through the conduit section 26 to the inlet of the ballast tank 22. The outlet of the ballast tank 22 is connected by conduit section 28 to the inlet to the wheel brake 14. The cooling fluid flows through this wheel brake, out of the brake outlet through conduit section 30 and into the heat exchanger 18. Conduit section 32 transports the brake cooling fluid from the heat exchanger 18 to the brake cooling fluid reservoir 16. Conduit section 34 delivers brake cooling fluid from reservoir 16 to the inlet of the wheel brake 10.

The ballast tank 22 is provided to handle excessively high speed stops so that during any one stop the cooling fluid will not be circulated for more than one complete circuit in the system, thereby preventing the receipt of oil that has already been heated by braking action during one stop. Thus, the ballast tank provides a container for a heat sink formed of cooling fluid. In this manner the oil will be heated about 100—120°F. and can be cooled between stops before it is again circulated through the system.

The modified system illustrated in FIG. 2 includes the wheel brakes 10 and 14, with the wheel brake 10 having the wheel driven pump 12. The system also includes the heat exchanger 18 associated with the vehicle engine coolant radiator 20. Wheel brake 10 is associated with the wheel 24. A reservoir 16 is also a part of the system. The conduit section 26 connects the outlet of the brake 10 to the heat exchanger 18; the conduit section 28 connects a heat exchanger outlet with the inlet of the wheel brake 14; the conduit section 30 connects the outlet of the wheel brake 14 with an inlet of the heat exchanger 18; and the conduit section 34 connects an outlet of the heat exchanger 18 with the inlet of the wheel brake 10.

In this system the heat exchanger 18 is schematically illustrated as being formed of two pipe sections 40 and 42 which pass through the cold tank portion of the radiator assembly 20. Pipe 40 interconnects conduit sections 26 and 28 and pipe 42 interconnects conduit sections 30 and 34. The reservoir 16 has an inlet 44 connected by means of a conduit section 46 to conduit section 26 intermediate wheel brake 10 and the heat exchanger pipe section 40. The conduit section 46 performs the dual function of providing a vent line so that any air which may become entrapped in the circulating system can find its way to the reservoir 16 and escape through the vented reservoir cap 48. The conduit section 46 is smaller in internal cross section area than the internal cross section area of conduit 26 or pipe section 40. Thus, only a minor portion of the fluid being circulated through conduit 26 will pass through the conduit section 46, and the major portion of the fluid will continue through pipe section 40. The reservoir 16 is provided with an outlet 52 to which is connected the conduit section 54. Section 54 is divided into conduit sections 56 and 58, with conduit section 56 being connected to the main circulation conduit section 34 at point 60, and with conduit section 58 being connected to the main circulation conduit section 28 at point 62. Points 60 and 62 are referred to as zero points. Zero points are points of substantially zero pressure and are ideally at points where the positive output pressure from the pump outlet is balanced by the intake or suction pressure of the pump inlet. In order to prevent pump cavitation, a supply of cooling fluid would ideally be provided directly in the pump inlet. Tests on systems of the type described have shown that this type of construction will permit a very high pump speed before cavitation occurs. This may be on the order of 5,000 pump impeller r.p.m. In a wheel driven pump, even though it is geared to run faster than the wheel, a much lesser pump speed is required as a maximum. For practical purposes, the supply line of cooling fluid that is furnished to prevent cavitation is usually connected somewhat farther away from the pump than the pump inlet itself. It is a characteristic of hydraulic systems of this type that the farther away from the pump inlet that the liquid supply is furnished, the lower the pump speed at which cavitation occurs. For practical reasons, the points of connection 60 and 62 are positioned a few inches away, but still sufficiently close to permit, without cavitation a higher a pump speed than would be attained at top vehicle speed. Therefore, for descriptive reasons, conduit sections 56 and 58 are said to be connected at or immediately adjacent the zero points of the system. Thus if a pump were provided as part of the wheel brake 14, the connection at zero point 62 would provide a supply of cooling fluid from reservoir 16 through conduit sections 54 and 58. Similarly, the connection at zero point 60 provides a supply of cooling fluid from reservoir 16 through conduit sections 54 and 56.

The reservoir 16 may also be provided with a substantially low oil level sensor 64 connected to energize a lamp or otherwise send a warning signal when the cooling fluid is sufficiently low to require such warning. The conduit section 46, which, as noted earlier, acts as a system fluid line, also performs the function of a pressure bleedoff line. Thus, should the cooling fluid in the main system expand under heat, the required fluid for such expansion is provided by the reservoir. Conduit section 46 may also have a cooling fluid filter in it. During operation there is a relatively low flow of cooling fluid through the reservoir but such flow will eventually permit all of the liquid to be filtered after a sufficient period of operation. The complete filtering of the fluid may require 50 to 100 miles of vehicle operation. However, such a bypass filtering arrangement is quite satisfactory.

In this system also, the coolant in the radiator 20 is provided as the first yield point so that overheat will cause the vehicle engine coolant temperature indicator to give a warning, and, if necessary, the coolant in radiator 20 will boil before the cooling fluid in the brake cooling system is broken down or before the wheel brakes are damaged by excessive heat. As in the system of FIG. 1, when the vehicle is being driven without the brakes being applied, the brake cooling system adds a great deal of cooling capacity to the vehicle cooling system. The amount of heat which can be dissipated by the total system depends upon the air-to-boil temperature. tests have shown that a higher air-to-boil temperature is obtained under hot weather high speed vehicle operating conditions.

The air-to-boil temperature is defined as the temperature at which the radiator coolant will boil (e.g. 254° F. with a pressure cap) minus the hot tank temperature (possibly 250° F.) plus the inlet air temperature of the radiator. It is desirable to have as large an air-to-boil temperature as feasible since this determines the amount of heat per unit of time that can be removed without boiling. Thus, in this example, if the ambient air is 90° F., the air-to-boil temperature would be 94° F. The increased capacity of the combined vehicle cooling system and the brake cooling system results in a lower hot tank temperature under the same heat load compared to a vehicle cooling system without the addition of the brake cooling system, thus increasing the air-to-boil temperature.

What I claim is:

1. A vehicle front wheel brake cooling system comprising:
   a first wheel brake to be cooled and a second wheel brake to be cooled, each of said wheel brakes having a cooling fluid inlet and a cooling fluid outlet,
   said first wheel brake having a cooling fluid pump driven by rotation of the wheel with which said first wheel brake is associated,
   cooling fluid container means and a cooling fluid cooler positioned remotely from said wheel brakes,
   and cooling fluid conduit means permanently connecting said first and second wheel brakes and at least one portion of said container means and said cooler in a loop in uninterrupted continuous series fluid flow relation with said second wheel brake being fluidly intermediate at least one portion of said container means and the inlet side of said cooler, and said first wheel brake always being fluidly intermediate the at least one portion of said container means and the outlet side of said cooler,
   said pump, when driven continuously pumping cooling fluid through all of said system.

2. The vehicle wheel brake cooling system of claim 1,
   said cooling fluid container means including another portion providing a reservoir receiving cooled fluid from said cooler and delivering cooled fluid to said first wheel brake.

3. The vehicle wheel brake cooling system of claim 1,
   said cooling fluid from said first wheel brake and delivering cooling fluid from said first wheel brake and delivering cooling fluid to said second wheel brake, said cooler being connected fluidly intermediate said wheel brakes, said ballast tank and said conduit means having a sufficient volume to prevent the recirculation to a braking brake of heated fluid which has been heated by a braking brake during a single stop.

4. The vehicle wheel brake cooling system of claim 1, said cooling fluid container means including;
   a reservoir receiving cooling fluid from said cooler and delivering cooling fluid to said first wheel brake,
   and a ballast tank receiving cooling fluid from said first wheel brake and delivering cooling fluid to said second wheel brake.

5. A vehicle front wheel brake cooling system comprising;
   a first wheel brake to be cooled and a second wheel brake to be cooled, each of said wheel brakes having a cooling fluid inlet and a cooling fluid outlet and only said first wheel brake having a cooling fluid pump driven by rotation of the wheel with which said first wheel brake is associated,
   cooling fluid container means and a cooling fluid cooler positioned remotely from said wheel brakes, and cooling fluid conduit means operatively and uninterruptedly fluid connecting the fluid inlet of said first wheel brake to the fluid outlet of said second wheel brake and the fluid outlet of said first wheel brake to the fluid inlet of said second wheel brake and said container means intermediate said wheel brakes,
   said conduit means further uninterruptedly fluid connecting said cooler to cool cooling fluid flowing from one of said wheel brakes to the other of said wheel brakes.

6. The vehicle wheel brake cooling system of claim 5,
   said pump being driven by the front vehicle wheel that is nearer the center of the road in normal road driving conditions.

7. The vehicle wheel brake cooling system of claim 5,
   said cooler being the cold tank of the vehicle engine cooling system radiator
   whereby heat is transferred between brake cooling fluid and radiator coolant when a temperature differential exists between the brake cooling fluid and the radiator coolant at said cooler.

8. The vehicle wheel brake cooling system of claim 7, said system having a heat transfer capacity sufficient to overheat the radiator coolant before detrimental overheating of said wheel brakes and said brake cooling fluid.

9. The vehicle wheel brake cooling system of claim 5, said cooler being connected through said conduit means to cool fluid flowing from said first wheel brake to said second wheel brake and to cool fluid flowing from said second wheel brake to said first wheel brake.

10. The vehicle wheel brake cooling system of claim 9, said system further comprising:
   a cooling fluid reservoir having an inlet fluid conduit connected to the portion of said fluid conduit means connecting said first wheel brake to said cooler and at a high point in said portion so that said reservoir inlet fluid conduit also provides an air vent line and means through which cooling fluid can expand when heated,
   an outlet conduit connected to the portion of said fluid conduit means connecting said cooler to said second wheel brake, said outlet conduit also being connected to the portion of said fluid conduit means connecting said cooler to said first wheel brake,
   said outlet conduit connections to said fluid conduit means being substantially at pressure nodal points and sufficiently close to the pressure nodal points to prevent cavitation within said system within the operating speed range of the pump in the system.

11. In combination in a liquid cooled vehicle wheel brake system:
   a heat exchanger for cooling heated cooling liquid,
   a plurality of liquid cooled vehicle wheel brakes,
   a cooling liquid circulating pump,
   conduit means for conducting cooling liquid and connecting said heat exchanger and said liquid cooled vehicle wheel brakes and said pump in cooling liquid series flow relation,
   and a cooling liquid reservoir having cooling liquid inlet and outlet means fluid connected to said conduit means in series fluid flow relation with said pump and in parallel fluid flow relation with said heat exchanger and providing a partial bypass of said heat exchanger and a partial bypass of one of said wheel brakes.

12. In the liquid cooled vehicle wheel brake system of claim 11:
   said cooling liquid reservoir outlet means being connected to a section of said conduit means conducting liquid from said heat exchanger to another of said wheel brakes, and also being connected to another section of said conduit means conducting liquid from said heat exchanger to said one of said wheel brakes.

PO-1050
(5/69)

UNITED STATES PATENT OFFICE
CERTIFICATE OF CORRECTION

Patent No. 3,590,960  Dated July 6, 1971

Inventor(s) Donald W. Reynolds

It is certified that error appears in the above-identified patent and that said Letters Patent are hereby corrected as shown below:

In the reference: 624,382 "6/1965" should read
-- 7/1961 --.
Column 2, line 14, the word "lose" should read -- loose --.
Column 3, line 62, the word "tests" should be written
-- Tests --.
Claim 3, line 31, after "said cooling fluid" delete the
words "from said first wheel brake and delivering" and
insert the words -- container means one portion including
a ballast tank receiving --.

Signed and sealed this 18th day of April 1972.

(SEAL)
Attest:

EDWARD M. FLETCHER, JR.
Attesting Officer

ROBERT GOTTSCHALK
Commissioner of Patents